(12) United States Patent
Sun et al.

(10) Patent No.: US 9,330,179 B2
(45) Date of Patent: *May 3, 2016

(54) CONFIGURING WEB CRAWLER TO EXTRACT WEB PAGE INFORMATION

(71) Applicant: Alibaba Group Holding Limited, George Town (KY)

(72) Inventors: Yiming Sun, Hangzhou (CN); Qi Qiang, Hangzhou (CN); Boyang Cai, Hangzhou (CN); Xiaojun Jin, Hangzhou (CN); Zongyuan Wu, Hangzhou (CN)

(73) Assignee: Alibaba Group Holding Limited (KY)

( * ) Notice: Subject to any disclaimer, the term of this patent is extended or adjusted under 35 U.S.C. 154(b) by 13 days.

This patent is subject to a terminal disclaimer.

(21) Appl. No.: 14/523,731

(22) Filed: Oct. 24, 2014

(65) Prior Publication Data

US 2015/0106357 A1    Apr. 16, 2015

Related U.S. Application Data

(63) Continuation of application No. 14/081,105, filed on Nov. 15, 2013, now Pat. No. 9,015,144, which is a continuation of application No. 13/552,374, filed on Jul. 18, 2012, now Pat. No. 8,612,420.

(30) Foreign Application Priority Data

Jul. 22, 2011    (CN) .......................... 2011 1 0207897

(51) Int. Cl.
*G06F 17/30*    (2006.01)
*G06F 7/00*    (2006.01)
*G06Q 30/02*    (2012.01)
*G06Q 10/10*    (2012.01)

(52) U.S. Cl.
CPC .... *G06F 17/30864* (2013.01); *G06F 17/30905* (2013.01); *G06F 17/30707* (2013.01); *G06F 17/30873* (2013.01); *G06F 17/30887* (2013.01); *G06Q 10/10* (2013.01); *G06Q 30/02* (2013.01)

(58) Field of Classification Search
USPC .................................................. 707/710, 802
See application file for complete search history.

(56) References Cited

U.S. PATENT DOCUMENTS

| | | | | |
|---|---|---|---|---|
| 6,925,595 B1* | 8/2005 | Whitledge et al. | | 715/234 |
| 8,407,576 B1* | 3/2013 | Yin et al. | | 715/206 |
| 8,612,420 B2* | 12/2013 | Sun et al. | | 707/710 |
| 2007/0143398 A1* | 6/2007 | Graham | | 709/204 |
| 2012/0117455 A1* | 5/2012 | Fogel et al. | | 715/221 |
| 2012/0151329 A1* | 6/2012 | Cordasco | | 715/234 |

FOREIGN PATENT DOCUMENTS

CN    101582075    11/2009

* cited by examiner

*Primary Examiner* — Kuen Lu
(74) *Attorney, Agent, or Firm* — Van Pelt, Yi & James LLP

(57) ABSTRACT

Web crawling configuration includes: obtaining a webpage comprising a plurality of receiving a user selection of a node in the webpage; presenting a set of web crawling configuration options pertaining to a web crawling action to be performed with respect to the node, the set of web crawling configuration options depending at least in part on a type of an element included in the node and comprising: a first option to perform a first web crawling action in the event that the node include a first type of the element; and a second option to perform a second web crawling action in the event that the node includes a second type of the element; receiving a user input specifying the web crawling configuration option; and storing user specified web crawling configuration option, performing the web crawling action on the node according to the user input, or both.

21 Claims, 6 Drawing Sheets

CONFIGURING WEB CRAWLER TO EXTRACT WEB PAGE INFORMATION

CROSS REFERENCE TO OTHER APPLICATIONS

This application is a continuation of co-pending U.S. patent application Ser. No. 14/081,105, entitled CONFIGURING WEB CRAWLER TO EXTRACT WEB PAGE INFORMATION filed Nov. 15, 2013 which is incorporated herein by reference for all purposes, which is a continuation of U.S. patent application Ser. No. 13/552,374, now U.S. Pat. No. 8,612,420, entitled CONFIGURING WEB CRAWLER TO EXTRACT WEB PAGE INFORMATION filed Jul. 18, 2012 which is incorporated herein by reference for all purposes, which claims priority to People's Republic of China Patent Application No. 201110207897.1 entitled A WEB PAGE INFORMATION EXTRACTION METHOD AND EXTRACTION SYSTEM filed Jul. 22, 2011 which is incorporated herein by reference for all purposes.

FIELD OF THE INVENTION

This application involves web page processing technology; in particular, it involves a web page information extraction method and system.

BACKGROUND OF THE INVENTION

Web page information extraction (e.g., web crawling) is the retrieval of web page data, and the subsequent extraction and separation of useful data using program analysis. For example, writing a program to extract a certain news headline from the news channel of a certain website is a kind of web page information extraction. At present, information extraction is divided into two primary types: one type is rules-based extraction, in which the rules may be formulated manually, or can be obtained through learning; the other type is extraction utilizing machine learning methods.

One part of search engine work is web page information extraction. As the internet has developed, the scale of information on the internet has also expanded continuously. Because the data on the internet comes from a large number of different websites, and the page structures on different websites vary greatly, search engines have therefore been unable to develop universal extractors to analyze web pages from different websites.

For this reason, the earliest search engines, and particularly vertical search engines (specialized search engines targeting certain fields of knowledge), utilized many targeted extractors to resolve this problem, i.e., each extractor was targeted at extraction of web page information from a certain website or having a certain type of page structure. However, because this information extraction method required that multiple targeted extractors be maintained, it had the problem of difficulty of maintenance, and the addition of a new website or type of website required the development of new targeted extractors, which also made development costs very high.

Subsequently, people began to search for schemes capable of automatically generating extractors. For example, the Locoy Spider is an information extraction method that is primarily based on regular expression and includes functions such as information capturing, extraction, and publication, using regular expression configured by the user to realize customized capturing and extraction.

However, this type of information extraction method based simply on regular expression still requires manual configuration of regular expression; its level of automation remains low and is insufficiently supportive of high-volume web page extraction. Moreover, users need to have a mastery of regular expression knowledge, and are also required to have a substantial understanding of web page structure, so that for non-professionals, the technical threshold is relatively high.

BRIEF DESCRIPTION OF THE DRAWINGS

Various embodiments of the invention are disclosed in the following detailed description and the accompanying drawings.

DETAILED DESCRIPTION

Figure 1:
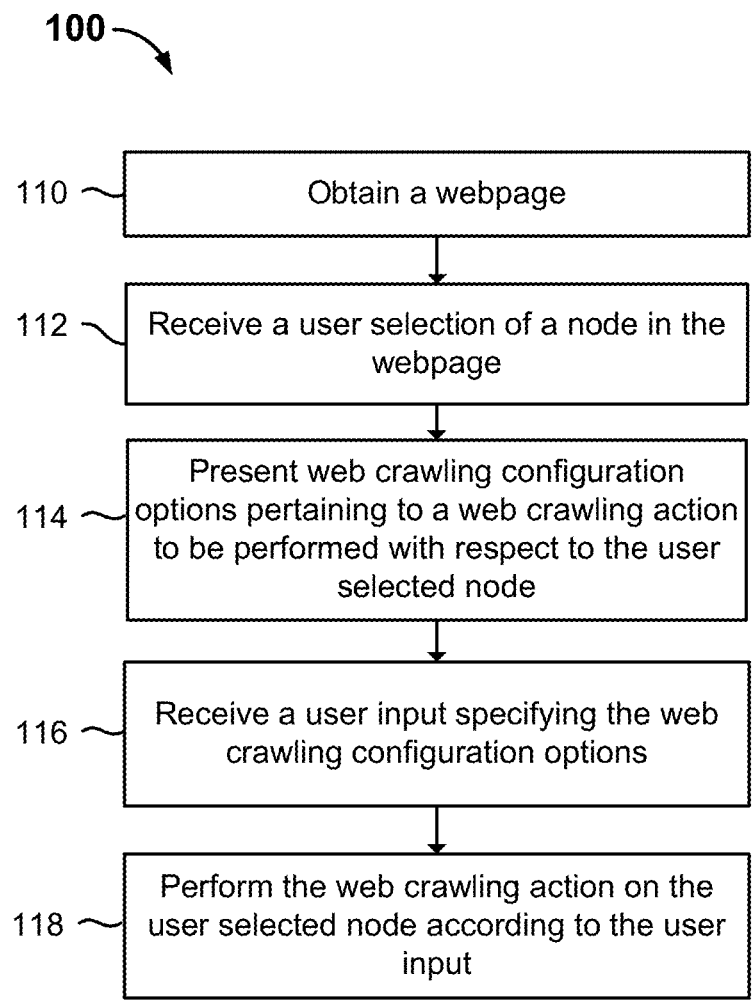
FIG. 1 is a flowchart illustrating an embodiment of a method for configuring web crawling.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method for configuring web crawling is disclosed. As described herein, web crawlers automatically navigate web pages and extract information from the pages. In some embodiments, a web crawling configuration tool allows a web crawler to be configured by a user using a graphical user interface (GUI). In some embodiments, the tool presents a webpage to the user in the form of a hierarchical structure, such as a Document Object Model (DOM) tree. A DOM tree includes a number of nodes. A node can be an element, an attribute, text, etc. A user is provided with a user interface to select a node to configure for web crawling. In some embodiments, different types of nodes lead to different web crawling configuration options pertaining to web crawling actions. One or more web crawling configuration options corresponding to the selected node are presented to the user, who indicates the settings of the web crawling configuration options. The settings are saved. Later, when the web crawler is invoked and web crawling is to be performed, the web crawling actions will be performed according to the user's settings of the web crawling configuration options.

In some embodiments, a web crawling action comprises extracting text, capturing an image, processing a link, triggering an event associated with a node, or setting a form element. In some embodiments, a web crawling configuration option comprises a setting that a configured web crawling action is to be applied to multiple nodes. In some embodiments, a preview is presented of the web crawling action performed on the user selected node.

FIG. 1 is a flowchart illustrating an embodiment of a method for configuring web crawling. Web crawling comprises automatically navigating web pages and extracting information out of them. A web crawler refers to a computer program that crawls and navigates through web pages using the various links on the webpages and extracts content or information out of each webpage the web crawler visits. In some embodiments, a web crawling configuration tool allows a web crawler to be configured by a user using a graphical user interface (GUI).

A user on a computer configures a web crawler that extracts information from a web page using the web crawler configuration tool. For example, a user configures the web crawler to extract product information from http://www.buysomestuff.com/product/342890.html. However, some pages on http://www.buysomestuff.com are not useful, and thus the user configures the web crawler to extract only a minimum amount of information or not to extract information out of such pages at all (e.g., http://help.buysomestuff.com/help/question-65.html, which does not include product information.)

At 110 of system 100, a webpage is obtained. The obtained webpage is a webpage that is to be configured for web crawling. In some embodiments, an address of the webpage to be crawled or extracted is received. In some embodiments, the user configuring the web crawler enters a URL of the webpage to be crawled.

In some embodiments, the web crawler configuration tool is implemented as a stand-alone application executed on a computer in communication with the web crawler. In some embodiments, the web crawler configuration tool comprises an interface comprising client-side executed code and/or server-side executed code for receiving the web crawling configuration inputted by the user. In some embodiments, a web browser is used as an interface to receive user input specifying web crawling configuration options for web crawling. In some embodiments, the web browser displays a GUI for configuring web crawling. In some embodiments, the received user input specifying the web crawling configuration options is sent to the web crawler to execute the web crawling. In some embodiments, the webpage to be crawled is loaded into an application that allows the webpage to be displayed and receives user selections and user input indicating the web crawling configuration options for web crawling actions.

In some embodiments, the web crawler configuration tool is a part of the web crawler and is executed on the same server. In some embodiments, the web crawling configuration is received by a web crawling configuration tool at a separate server from the web crawler and sent to the web crawler. As understood by one of ordinary skill in the art, the web crawler configuring tool, the web crawling configuration interface, the web crawler, bot, and web crawling computer program can be implemented using a processor, a computer, a mobile device, a server, a network of computers, a network of servers, a cloud, or any suitable computing device.

The webpage obtained for configuring web crawling configuration options is presented. The webpage comprises content and code written in HTML, XML, XHTML, JavaScript and various other languages that can be executed by a browser. The typical webpage has an internal page structure that can be modeled using the Document Object Model (DOM). DOM also provides a programming interface for processing HTML and XML files. The elements in a webpage (e.g., text, pictures, forms, buttons, links, embedded objects, media, etc.) can be represented as DOM nodes, and be accessed and manipulated using programming interfaces associated with DOM. For example, a webpage's HTML file can be parsed by a DOM parser, and its elements are represented as nodes in a DOM tree.

The webpage comprises one or more nodes which comprise one or more elements of the webpage. Elements are content that can be found in webpages including text, pictures, forms, buttons, links, embedded objects, media, etc. For example, a node can comprise some text, a check box and more text. In some embodiments, a node has a position or location in the hierarchy of the DOM tree of the webpage. A user is presented with one or more nodes of a webpage that a web crawling action is to be performed on.

After the webpage is obtained, it is processed so that web crawling configuration options pertaining to a web crawling action can be configured. In some embodiments, the webpage is processed so that each node is selectable and can be configured for web crawling. In some embodiments, the webpage to be crawled is obtained, and code is added to the webpage to enable presenting and receiving web crawling configuration options. In some embodiments, the code comprises Javascript code. In some embodiments, the obtained webpage is inserted with code to allow pop-up windows used to present and receive the web crawling configuration options. In some embodiments, the tool itself includes special handler code for each type of node, which is invoked when a node is selected.

At 112, a user selection of a node in the webpage is received. A user indicates a selection of a node. For example, a user selection of a node can be indicated with a click, highlighting with a mouse, double click, button press, key press, tap, touch, highlight, mouse select, or any other appropriate action.

At 114, web crawling configuration options pertaining to a web crawling action to be performed with respect to the user selected node is presented. In some embodiments, depending on the node selected, options pertaining to web crawling actions that can be performed on the user selected node are presented. For example, if the node comprises some text followed by a button (such as a user agreement page and the "I agree" button), web crawling configuration options for a web crawling action related to extracting text and a form submit action are presented.

In some embodiments, a web crawling action comprises extracting text out of the node. In some embodiments, a web crawling action comprises capturing an image. In some embodiments, a web crawling action comprises processing a link. In some embodiments, a web crawling action comprises settings for an event that is triggered or to be triggered for the user selected node. In some embodiments, a web crawling configuration option for a web crawling action comprises settings for a form element in the webpage. In some embodiments, a web crawling configuration option comprises indicating a web crawling action and web crawling action configuration is for multiple nodes (i.e., the same web crawling action configuration is to be repeated for multiple nodes).

At 116, user input specifying the web crawling configuration options pertaining to the web crawling action is received. In some embodiments, a user selects a web crawling configuration option. For example, a user selects to enable automatic address recognition (i.e., recognizing a string of characters that looks like an address) when extracting text. In some embodiments, a user enters a web crawling configuration option pertaining to the web crawling action. For example, a user configuring a login page for web crawling enters a username and password in the web crawling configuration options pop-up, so that when the webpage is crawled by the web crawler, the web crawler automatically enters into the username and password text box the provided username and password. In some embodiments, a user specifies a web crawling action to be performed on the user selected node. For example, in order to see content to be extracted out of the webpage, a node requires a link to be hovered over which triggers a server to send additional information. Then, through the asynchronous request to the server, additional information is obtained and the information can be extracted.

In order to provide automatic crawling of web pages, in some embodiments, user input indicates a web crawling action comprising downloading the content of a link, referred to as a subpage of the initial page, and then configuring the subpage for web crawling. In some embodiments, the subpage is obtained and web crawling configuration options for web crawling the subpage are presented and received.

At 118, the web crawling action according to the user input is performed on the user selected node, according to the user input. The webpage is crawled according to the web crawling configuration option settings that the user had indicated when configuring the webpage for web crawling. For example, the user selected a picture on the product information webpage and indicated to download the picture and extract the alternative text (alt text). In some embodiments, the result of the one or more web crawling actions comprises extracted information or content. In some embodiments, the result of the one or more configured web crawling actions comprises actions performed in order to navigate through the webpage or expose additional information. In some embodiments, the web crawling actions for subpages are performed according to the user specified web crawling configuration options.

Figure 2:
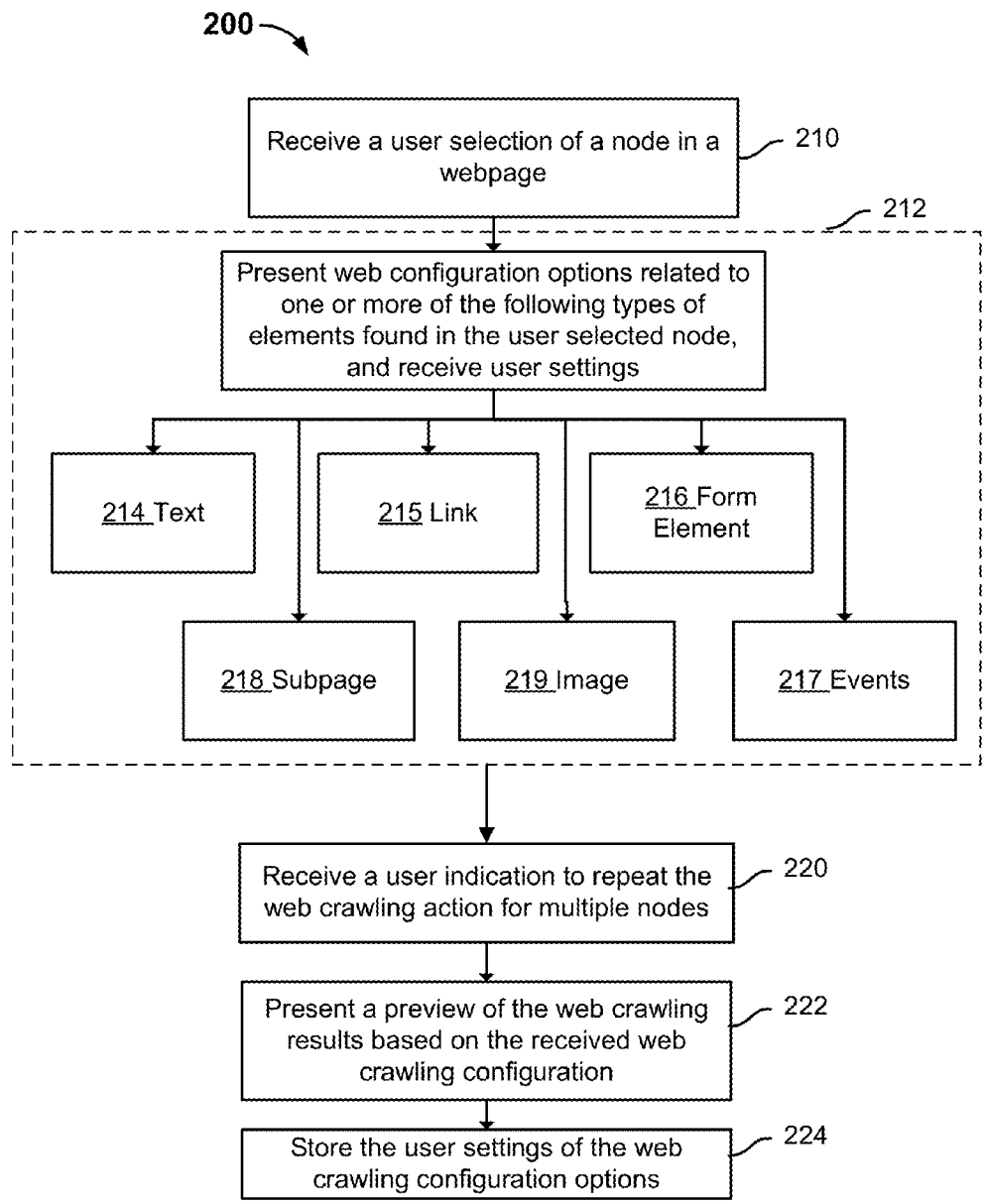
FIG. 2 is a flowchart illustrating an embodiment of presenting and receiving web crawling configuration options.

FIG. 2 is a flowchart illustrating an embodiment of presenting and receiving web crawling configuration options. At least a portion of 200 can be used to perform the step of 112, 114, or 116 in FIG. 1. At least a portion of 200 is implemented by the web crawler configuration tool.

At 210, user selection of a node in a webpage is received. The user selects a node in the webpage to configure for a web crawling action for that node. In some embodiments, the user selects the text (i.e., mouse click and drag to highlight text). For example, following an upclick event triggered (i.e., the user lets go of a mouse button), it is determined if any text was selected within the highlighted portion. In some embodiments, the user clicks on a node in the webpage. Other ways for selecting a node can also be used including: double click, button press, key press, tap, touch, highlight, or mouse select. In some embodiments a user selects an element in the node, which allows web crawling configuration options to be presented that are related to the element or to the node.

At 212, web crawling configuration options for a web crawling action to be performed related to the type(s) of element(s) found in the user selected node are presented, and user option settings are received. Depending on the type(s) of element(s) present in the node that are selected, different web crawling configuration options are presented (using the previously inserted Javascript code or other handling code). For example, if a node comprises text and a check box, then web crawling options including text extraction and toggling the input form element are presented. After 210, where a user selects a node in a selected page, one or more web crawling configuration options can be presented including one or more of the options available for an element, and the corresponding user settings are received. In some embodiments, the web crawling configuration options presented are the available options for the selected node. Details of the available options are explained in connection with boxes 214-219. In some embodiments, a graphical user interface (GUI) is presented in response to the user selection of a node. In some embodiments, user input specifying the web crawling configuration option is received through the GUI that is presented in response to the user selection of a node. For example, a pop-up window is presented with the web crawling configuration options associated with the selected node.

In some embodiments, when the webpage is obtained and processed, the corresponding web crawling configuration option pop-up dialog boxes are linked to the node depending on the elements and web crawling configuration options available for the node. Other GUI presentations can be used to display and receive web crawling configuration options pertaining to available web crawling actions to be performed on the user selected node, including: pop-up windows, pop-up dialog boxes, pop-up forms, a frame on the side of the screen, a toolbar on the side, and other suitable forms of GUI's.

In some embodiments, more than one web crawling configuration option for the elements in the node are presented and received in the same GUI. In some embodiments, all of the web crawling configuration options available in the system are presented and received for each node in the GUI. In some embodiments, the one or more web crawling configuration options are presented and received in successive GUI screens or successive GUI pop-up boxes.

In some embodiments, a node comprises text, and a web crawling action comprises extracting text out of the user selected node. Therefore, as shown in box 214, some of the possible web crawling configuration options for configuring text extraction include: whether to set a filter that comprises a regular expression or a string of characters with a wildcard character, and the specific regular expression/character string if the filter is set; whether to extract a property of the text (e.g., the class or id of the text); whether to enable date recognition (e.g., if the text contains a string of characters in the text that is recognized as a date, for instance "Jul. 1, 2012 San Jose, Calif. —Authorities have . . . " as part of the beginning of a news article, then "Jul. 1, 2012" is recognized as a date); whether to enable address recognition (e.g., determining whether a part of a string is a street address, or a URL); whether to extract the text name; whether to extract the text description; and whether to determine the length of extracted text. Other appropriate text-related options can be used.

In some embodiments, a node comprises a link. As shown in 215, some possible web crawling configuration options for processing a link include: whether to extract the alt text of the link (for example, if the node contains a link to http://www.abcde.com/23012.html but its alt text is set to "cool product page," then "cool product page" is captured); whether to capture a target URL included in the link; whether to enable text extraction of the link. Other appropriate link-related processing options can be used. The user can choose to set one or more of these options and the results are received in 212.

In some embodiments, the node comprises a link to a subpage, which is a webpage that is referenced by a link on the webpage currently being configured for web crawling. In some embodiments, the webpage that the user initially enters in the web crawler configuration tool is called the initial page and webpages that link from the initial page are considered subpages. Thus, the options corresponding to 218 include whether to download the content of the link to the subpage and whether to configure the downloaded page for web crawling in a similar way as the original page. In other words, the user has the option to specify whether the subpage is also to be crawled. Further, in some embodiments, a webpage linked from the subpage (i.e., a subpage of the subpage) is also configured for web crawling. Therefore a tree of webpages can be configured for web crawling using the web crawler configuration tool.

In some embodiments, the node comprises an image 219. Some of the possible options corresponding to 219 include: whether to download and capture the image; whether to capture image name and image description; whether to perform image processing and/or image transformation; whether to extract the alt text from the image. In some embodiments, the node includes an image with a link (i.e., or a link with an image), and web crawling configuration options presented show options to capture the image and availability of the link web crawling configuration options.

In some embodiments, a node comprises a form element. Configuring form elements in the webpage to be crawled allows the web crawler to navigate effectively through a webpage that requires user input. Some possible web crawling configuration options for a web crawling action related to a form element (216) in the webpage include: whether a text box is to be configured to be inputted with text indicated by the user; the specific text to be input into the text box (e.g., the user can enter text in the web crawling configuration option GUI or provide an input text file that contains the text to be inserted into the text box). For example, in a text box for a username, a user enters into the web crawling configuration tool the username to be automatically inserted into the text box when the web crawler is navigating through the website and extracting information as the configuration option setting.

Forms in an HTML webpage are associated with a method and action called to handle the form. In some embodiments, a button is configured to execute the method or action. For example, a button with a submit action, is configured to be clicked at the end of a form. Thus, another option associated with the form element is whether to click the submit button at the end of a form. Other form input elements that can also be configured by the user for web crawling including: radio buttons, check boxes, buttons, reset buttons, menus, and drop boxes. For example, the user can specify whether a check box in a node is to be checked.

In some embodiments, a node comprises an element that has an event associated with it. Box 217 shows the options to be configured in connection with an event. In some embodiments, a web crawling action comprises settings for an event that is to be triggered for the user selected node. Webpages when executed by the web browser respond to events triggered by user interaction with the webpage. In some embodiments, one or more following events can be configured: single click, mouse hover, mouse exit, wheel operation, and double click. In some embodiments, the user further configures the web crawling configuration options to trigger an event. For example, the user can configure that, when a link is hovered over, the triggered events include additional web crawling actions to be performed on the node. For example, when the link is hovered over, the webpage reveals additional text information, and the additional text information is configured to be extracted.

214-219 illustrate some of the possible configuration options for different types of nodes. Other options and node types are possible. The user can choose to set one or more of these options, and the results are received in 212.

At 220, user indication to repeat the web crawling action for multiple nodes is optionally received. In some embodiments, a web crawling configuration option comprises indicating a web crawling action and web crawling action configuration are for multiple nodes (i.e., the same web crawling action configuration is to be repeated for multiple nodes). In some embodiments, a web crawling configuration option is indicated to be repeated for nodes that are sibling nodes in the DOM tree. In some embodiments, a sibling node is a node that shares a same parent node. For example, in a webpage with an article containing three paragraphs wrapped in a <div id=content> tag and each paragraph is enclosed in a <p> HTML tag, the three paragraphs are sibling nodes in the DOM tree. Thus, a web crawling configuration option to extract the text and label the text with a name of "article content" is to be repeated for all three paragraphs. This simplifies indicating of the web crawling configuration, since instead of having to select each paragraph and specify the same web configuration options for each paragraph, a single specification is applied to all of the sibling nodes. In some embodiments, sibling nodes are also considered as a list of nodes. In some embodiments, settings to apply to the web crawling configuration options for multiple nodes in a list are received. For example, a bullet list of links to news articles related to the current webpage are configured to have the same web crawling actions performed on each link in the list.

In some embodiments, a start node is specified by the user. In some embodiments, an end node is specified by the user. Other web crawling configuration options for repeating a web crawling configuration on multiple nodes comprise: number of items to extract, a list start offset, a list end offset, and spacing of list items. In some embodiments, multiple nodes in a list are configured to only perform the web crawling action on nodes that start with a specific character string and/or end with a specific character string. For example, a list of news headlines starts with a tag "[National]" or "[International]" and the web crawler can be configured to extract only the news headlines starting with the "[National]" character string.

In some embodiments, the user indicates that all of the configured web crawling actions or a portion of the configured web crawling actions are to be repeated for a subpage. When a user indicates to download the content of the link, or to download a subpage, a user can indicate to repeat the same web crawling configuration (i.e., the sum of or a portion of the web crawling action their configured web crawling configuration options) as the initial page, or the page the subpage is linked from. For example, if the subpage has a very similar webpage structure, such as if the initial page is the first page of the article, then the link to the second page of the article can be indicated to be downloaded and the same web crawling configuration options pertaining to the web crawling actions can be performed on the second page of the article.

In some embodiments, a subpage from the initial webpage is different in structure from the initial webpage, and new web crawling configuration options for one or more configured web crawling actions are specified by the user. In some embodiments, a navigation tree of the tree of webpages configured for web crawling is presented to the user, so that the user is able to navigate between the webpages and configure a webpage for web crawling. In some embodiments, the subpage is configured for web crawling in a separate window. In some embodiments, subpages are indicated to be downloaded and the web crawling configuration options for the subpage are set by the user after the initial page is finished configuring.

At 222, a preview of the web crawling results on the node based on the received web crawling configuration options are presented. In some embodiments, a user indication (e.g., click on a link or a button) to preview the web crawling is received and a new window with the results of the web crawling action performed is presented. For example, if a list of sibling nodes is configured by the user to have text extracted from the first through third nodes in the list, the text extracted according to the web crawling configuration options set by the user is displayed in a new window, so that the user can check if the web crawling configuration options were set correctly. In some embodiments, more than one of (or all of) the web crawling actions to be performed on the configured webpage are presented to the user in the preview.

User selection of nodes in the webpage 210 and presenting one or more web crawling configuration options depending on the types (i.e., 212, and one or more of 214-219) is repeated until the desired nodes in the webpage are configured for web crawling. A preview of the results of the configured web crawling actions can be presented at any time during the configuring process. A user can configure nodes and also indicate repeating of web crawling actions.

At 224, in some embodiments, the user input specifying the settings for the web crawling configuration options is stored. In some embodiments, the user indicates to save the web crawling configuration setting in the pop-up box that presents the web crawling configuration settings for the selected node and settings for that node are saved. In some embodiments, the web crawling configuration setting is sent to the web crawler configuration tool on the web crawler server and stored. In some embodiments, the web crawling configuration setting is temporarily stored and then saved when all of the web crawling actions for the nodes on the webpage have been stored. In some embodiments, the webpage is stored when the web crawling configuration options are annotated on the webpage. In some embodiments, references to the webpage configured for web crawling and the web crawling configuration options are stored. In some embodiments the reference to the webpage comprises a URL. In some embodiments, the reference to the webpage comprises references to the nodes in the webpage. In some embodiments, the reference to the node is a node locator. In some embodiments, the node locator is determined using Xpath (i.e., XML Path language). In some embodiments, web crawling commands are generated using the web crawling configuration options indicated by the user. In some embodiments, the web crawling commands are stored in a database.

In some embodiments, a web crawling task comprises the web crawling configuration options and settings for web crawling actions and corresponding nodes for one webpage. In some embodiments, a web crawling task comprises the web crawling configuration options for web crawling actions to be performed on a tree of webpages, including an initial webpage and subpages.

Figure 3A:
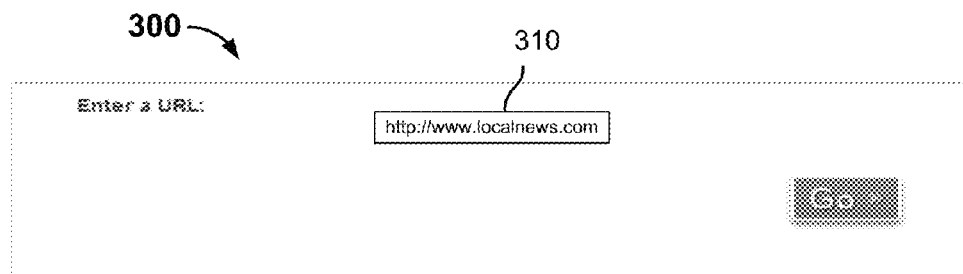
FIG. 3A is an example user interface screen of an embodiment of the web crawler configuration tool.

FIG. 3A is an example user interface screen of an embodiment of the web crawler configuration tool. In this example, graphical user interface 300 allows a user to enter a URL of a webpage to configure for web crawling. In some embodiments, text box 310 is provided for a user to enter a URL of a webpage to configure for web crawling.

Figure 3B:
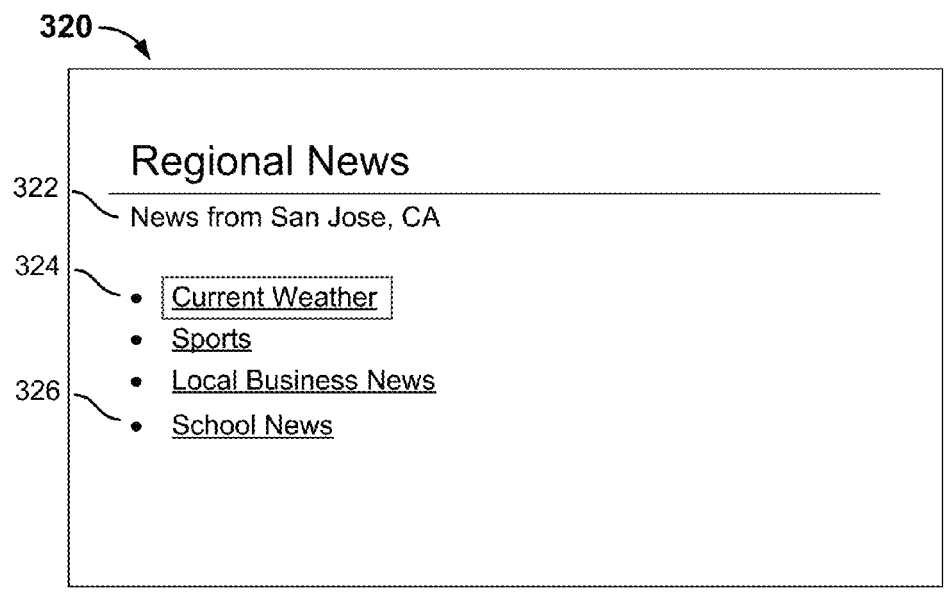
FIG. 3B is an example user interface screen showing a webpage to be configured for web crawling.

FIG. 3B is an example user interface screen showing a webpage to be configured for web crawling. Webpage 320 comprises nodes 322, 324, and 326. In this example, a user selects a node (e.g., clicks on a link or highlights and selects text) to configure for web crawling. For example, node 324, comprising a link to current weather, is selected and highlighted.

Figure 4A:
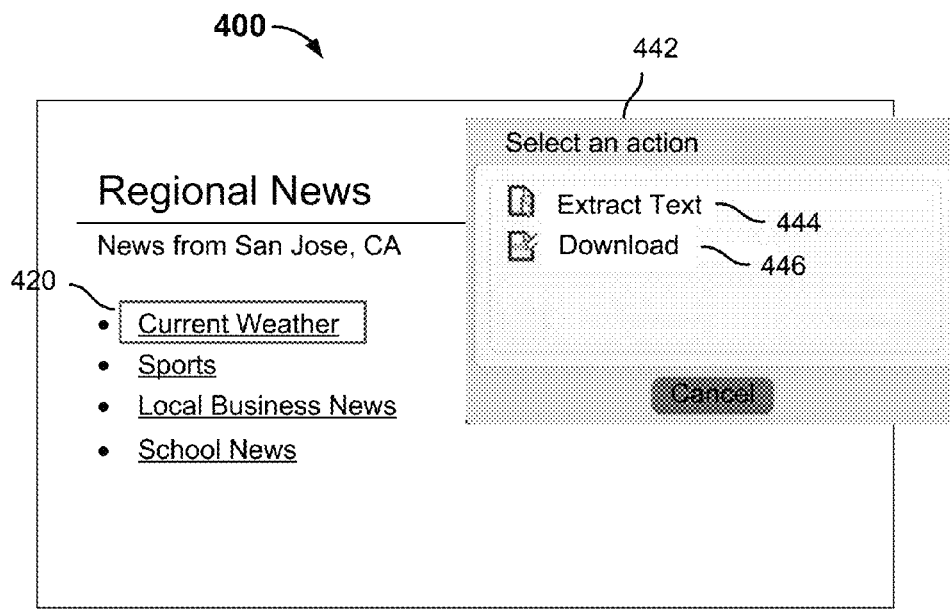
FIG. 4A is an example user interface screen showing web crawling actions being presented for a selected node.

FIG. 4A is an example user interface screen showing web crawling actions being presented for a selected node. As an example of how web crawling is configured, in system 400, pop-up window 442 presents web crawling configuration options of two web crawling actions to configure for selected link 420: extract text 444 or download 446. For example, a user can choose to extract text or to download the link or both, by clicking on the web crawling action.

Figure 4B:
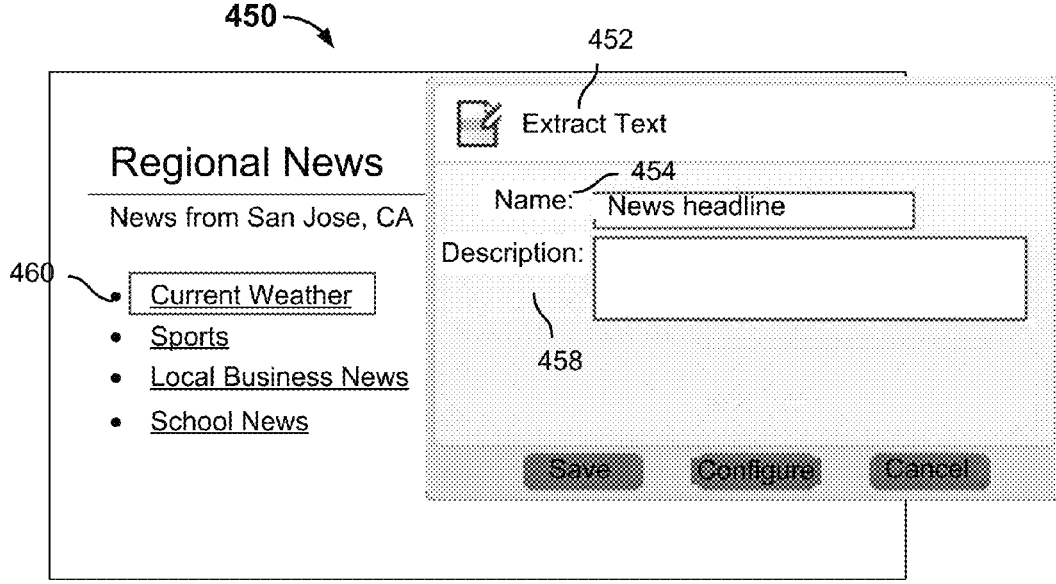
FIG. 4B is an illustration of an embodiment of web crawling configuration options pertaining to the web crawling actions that can be configured for a user selected node.

FIG. 4B is an illustration of an embodiment of web crawling configuration options pertaining to the web crawling actions that can be configured for a user selected node. For example, the user selected to extract the text out of selected link 460 and options for configuring the extract text action is presented in pop-up window 452 of system 450. For example, a user specifies name 454 for the selected text, which is given the name "News headline." Also a user can specify description 458 for the extracted text.

Figure 5:
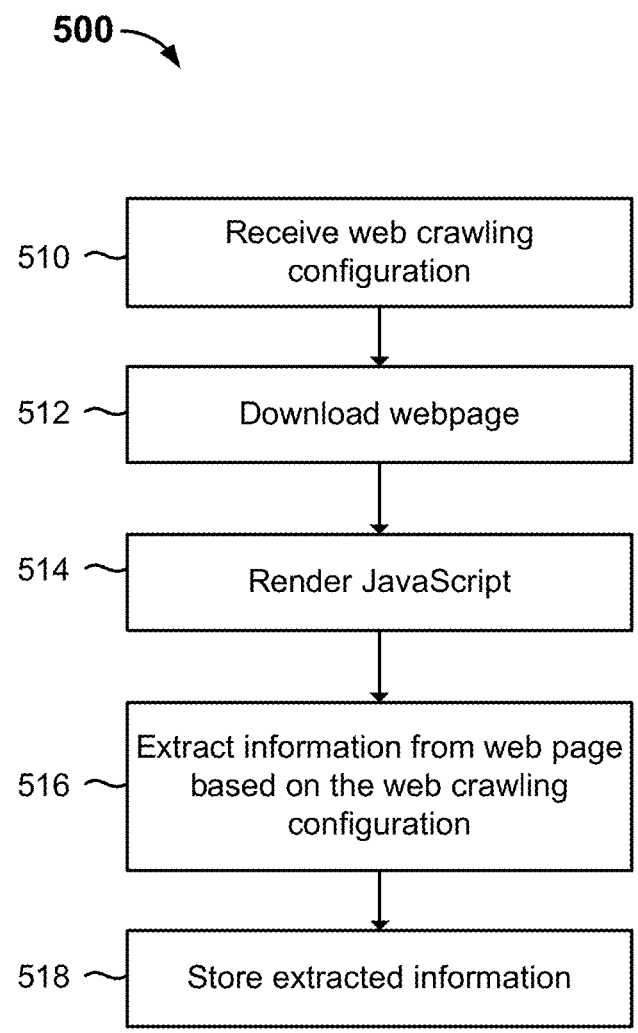
FIG. 5 is a flowchart illustrating an embodiment of a method for executing the web crawling according to the web crawling configuration options indicated by the user.

FIG. 5 is a flowchart illustrating an embodiment of a method for executing the web crawling according to the web crawling configuration options indicated by the user. At least a portion of 500 is performed by the web crawler.

At 510, the web crawling configuration is received. In some embodiments, the web crawling configuration comprises a web crawling task. In some embodiments, a web crawling task comprises a web crawling action configured by setting the web crawling configuration options and a node that the web crawling action is to be performed on. In some embodiments, a web crawling task comprises a webpage and the user specified web crawling configuration options and the corresponding nodes. In some embodiments, a web crawling task comprises a tree of webpages and their user indicated web crawling configurations. In some embodiments, the web crawling configuration or web crawling task is processed and commands for the web crawler are generated. In some embodiments, the web crawling configuration is stored and the web crawler determines if there is a new web crawling configuration stored, then loads the web crawling configuration and runs it. In some embodiments, a monitor determines if a new web crawling configuration is stored. In some embodiments, loading the web crawling configuration comprises scheduling one or more processors to perform the web crawling (i.e., the configured web crawling actions).

At 512, the webpage to be crawled is downloaded. In some embodiments, the initial page is downloaded, according to the URL or webpage referenced in the received web crawling task. In some embodiments, the subpages are also downloaded at the same time. In some embodiments, a webpage that is a subpage of another webpage is not loaded until the web crawler executes the configured web crawling actions for that webpage. In some embodiments, one or more of the following content of the webpage to be crawled are download: webpage source code, text, images, cookies, forms, style sheets, embedded objects, embedded media, linked files, and linked source code (e.g., Javascript included by reference, for instance "src=somecode.js").

In some embodiments, at 514, Javascript in the webpage is rendered. In some embodiments, the web crawler uses a Javascript renderer to execute and run the Javascript code from a portion of the webpage that contains Javascript and return the resulting webpage. In some embodiments, the downloaded webpage containing Javascript is sent to the Javascript renderer and the resulting rendered webpage is returned. In some embodiments, according to the configured web crawling actions, the Javascript is rendered. Javascript events that were configured are rendered or executed. For example, an icon that creates a pop-up window and gets more information from the server is configured to be clicked, using the web crawling configuration tool. Then according to the web crawling configuration, Javascript is triggered through a click event and a Javascript command is rendered using the Javascript renderer to get more information from the server and display it.

At 516, information is extracted from the webpage based on the web crawling configurations. In some embodiments, information is extracted from the rendered webpage. In some embodiments, the web crawling configuration options for an extract text action is configured, and according to the web crawling configuration, the user indicated text is extracted. In some embodiments, a node is referenced by a locator (e.g., XPath) and the configured web crawling actions are performed on the node. In some embodiments, a node is extracted or a web crawling action is performed based on a class attribute in the HTML tag surrounding or enclosing the element or node. In some embodiments, an id attribute in the HTML tag surrounding the selected node is used to extract text or perform a web crawling action. In some embodiments, certain id or class attributes are weighted higher and expected to extract more accurate information than extracting using the node locator. For example, a node comprising the HTML tag with "id=price" is more relied upon than a node located at the third <div> in the webpage to extract out the price. The id attribute is weighted higher than the node locator for determining which text to extract, or that the extracted text is the desired extracted text. In some embodiments, because a webpage configured for web crawling can change after the configuration, an HTML attribute is weighted higher than the node locator for identifying the desired node or information to extract.

For example, the web crawling configuration indicates that an image is to be captured and at 516, the image is captured. In some embodiments, information is to be extracted from a subpage of the webpage according to the web crawling configuration. In some embodiments, information is extracted from one webpage and the URLs of the subpages that are to be crawled is returned. For the subpage, receiving a web crawling configuration 510, downloading 512, rendering Javascript 514, extracting information based on the web crawling configuration 516, and storing the extracted information 518 are repeated. Therefore, automatic web crawling is performed comprising extracting information from a webpage according to the web crawling configuration for that webpage, crawling to a subpage, and extracting information from the subpage.

At 518, the extracted information is stored. In some embodiments, the extracted information is stored in a database. In some embodiments, the extracted information is stored with a user indicated name or description or both. In some embodiments, the extracted information is stored and sent. In some embodiments, the extracted information is sent to be processed. In some embodiments, the extracted information is presented to the user. In some embodiments, the stored extracted information awaits a user request to download the extracted information.

Figure 6:
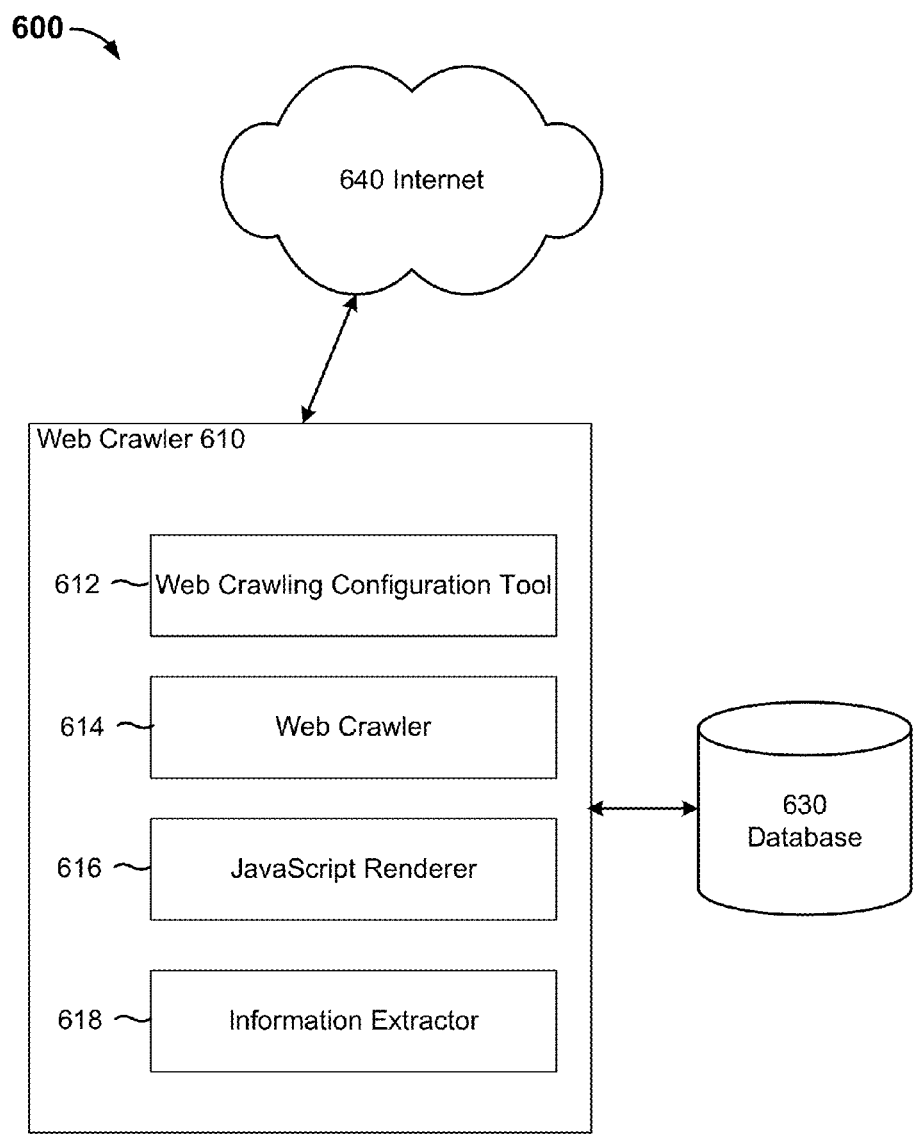
FIG. 6 is a block diagram of an embodiment of the web crawler and the environment of the web crawler.

FIG. 6 is a block diagram of an embodiment of the web crawler and the environment of the web crawler. Web crawler 610 of system 600 is connected to or in communication with the internet 640 to download webpages to be crawled. In some embodiments, web crawler 610 comprises web crawling configuration tool 612. In some embodiments, web crawling configuration tool 612 is on a separate server than web crawler 610 and web crawling configurations are sent to web crawler 610. In some embodiments, web crawler 610 also comprises webpage downloader 614. In some embodiments, webpage downloader obtains the webpages to be crawled. At least a portion of 512 of FIG. 5 is performed by webpage downloader. In some embodiments, web crawler 610 comprises Javascript renderer 616. In some embodiments, Javascript renderer renders Javascript on the webpages to be crawled. At least a portion of 514 of FIG. 5 is performed by Javascript rendered 616. In some embodiments, web crawler 610 comprises information extractor 618. In some embodiments, information extractor 618 extracts information out of the webpage that is configured for web crawling, according to the user specified web crawling configuration. At least a portion of 516 of FIG. 5 is performed by information extractor 618. In some embodiments web crawler 610 is communicatively coupled to database 630. In some embodiments, web crawler 610 stores in database 630 the web crawling configurations or web crawling tasks. In some embodiments, web crawler 610 stores in database 630 the extracted information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for configuring web crawling, comprising:
one or more processors to:
    obtain a webpage comprising a plurality of nodes;
    present the webpage to a user;
    receive a user selection of a node in the webpage, the node comprising at least one element;
    in response to the user selection of the node, present a web crawling configuration option pertaining to a web crawling action to be performed with respect to the node, the web crawling configuration option depending at least in part on a type of an element included in the node;
    receive a user input specifying the web crawling configuration options pertaining to the web crawling action to be performed with respect to the node and a user indication to specify repeatedly the web crawling action to be performed on the plurality of nodes;
    specify repeatedly the web crawling action to be performed for the plurality of nodes;
    store user specified web crawling configuration options;
    perform the web crawling action on the plurality of nodes according to the user input;
    receive another user selection of a second node in the webpage; and
    receive a user input specifying an option pertaining to a web crawling action to be performed with respect to the second node; and
one or more memories coupled to the one or more processors, to provide the one or more processors with instructions.

2. The system of claim 1, wherein the one or more processors are further to process the obtained webpage such that each node is configurable for web crawling.

3. The system of claim 1, wherein the one or more processors are further to present a preview of the performed web crawling action according to the user input.

4. The system of claim 1, wherein the webpage is presented to the user via a graphical user interface (GUI).

5. The system of claim 1, wherein the web crawling action comprises text extraction.

6. The system of claim 5, wherein the web crawling configuration options for text extraction comprise configurations for one or more of: a filter, address extraction, date extraction, extracted text name, extracted text description, and format.

7. The system of claim 1, wherein the web crawling configuration option comprises settings associated with a node that is a link and the web crawling action comprises downloading the link.

8. The system of claim 7, wherein downloading the link comprises obtaining a subpage; and the one or more processors are further to present a web crawling configuration option pertaining to a web crawling action to be performed with respect to one or more nodes on the subpage.

9. The system of claim 8, the one or more processors are further to present a navigation tree of webpages, and associated web crawling configuration options with the webpage in the navigation tree of webpages.

10. The system of claim 1, wherein the web crawling configuration option pertaining to the web crawling action comprises one or more of the following link processing settings: extracting link text, extracting alt text, and extracting link target URL.

11. The system of claim 1, wherein the web crawling configuration option comprises a setting for downloading an image, capturing the image, or both.

12. The system of claim 1, wherein the web crawling configuration option comprises a setting for an event associated with the node, wherein the event includes: click, double click, mouse hover, rolling wheel operation, or mouse exit.

13. The system of claim 1, wherein the web crawling configuration option comprises a setting for a form element comprising a text box, wherein the setting comprises input text.

14. The system of claim 1, wherein the web crawling configuration option comprises a setting for a form element comprising: a text box, a button, a radio button, or a check box.

15. The system of claim 1, the one or more processors are further to store a locator of the node.

16. The system of claim 15, wherein the locator of the node selected by the user is based on XPath.

17. The system of claim 1, wherein performing the web crawling action on the node comprises downloading the webpage to be crawled.

18. The system of claim 1, wherein performing the web crawling action on the node comprises rendering Javascript code of at least a portion of the webpage.

19. The system of claim 1, further comprising storing results of the performed web crawling action.

20. A method for configuring web crawling, comprising:
obtaining, using one or more computer processors, a webpage comprising a plurality of nodes;
presenting the webpage to a user;
receiving a user selection of a node in the webpage, the node comprising at least one element;
in response to the user selection of the node,
presenting a web crawling configuration option pertaining to a web crawling action to be performed with respect to the node, the web crawling configuration option depending at least in part on a type of an element included in the node;
receiving a user input specifying the web crawling configuration options pertaining to the web crawling action to be performed with respect to the node and a user indication to specify repeatedly the web crawling action to be performed on the plurality of nodes;
specifying repeatedly the web crawling action to be performed for the plurality of nodes:
storing user specified web crawling configuration options;
performing the web crawling action on the plurality of nodes according to the user input;
receiving another user selection of a second node in the webpage; and
receiving a user input specifying an option pertaining to a web crawling action to be performed with respect to the second node.

21. A computer program product for configuring web crawling, the computer program product being embodied in a tangible non-transitory computer readable storage medium and comprising computer instructions for:
obtaining, using one or more computer processors, a webpage comprising a plurality of nodes;
presenting the webpage to a user;
receiving a user selection of a node in the webpage, the node comprising at least one element;
in response to the user selection of the node, presenting a web crawling configuration option pertaining to a web crawling action to be performed with respect to the node, the web crawling configuration option depending at least in part on a type of an element included in the node;
receiving a user input specifying the web crawling configuration options pertaining to the web crawling action to be performed with respect to the node and a user indication to specify repeatedly the web crawling action to be performed on the plurality of nodes;
specifying repeatedly the web crawling action to be performed for the plurality of nodes.
storing user specified web crawling configuration options;
performing the web crawling action on the plurality of nodes according to the user input;
receiving another user selection of a second node in the webpage; and
receiving a user input specifying an option pertaining to a web crawling action to be performed with respect to the second node.

* * * * *